United States Patent
Jeon

(10) Patent No.: US 12,497,299 B2
(45) Date of Patent: Dec. 16, 2025

(54) NITROGEN-DOPED GRAPHITIC NANOPLATE WITHOUT IRON DOPING AND MANUFACTURING METHOD THEREFOR

(71) Applicant: WONKWANG UNIVERSITY CENTER FOR INDUSTRY-ACADEMY COOPERATION, Iksan-si (KR)

(72) Inventor: In Yup Jeon, Iksan-si (KR)

(73) Assignee: WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 734 days.

(21) Appl. No.: 17/904,416

(22) PCT Filed: Sep. 28, 2020

(86) PCT No.: PCT/KR2020/013220
§ 371 (c)(1),
(2) Date: Sep. 16, 2022

(87) PCT Pub. No.: WO2021/167196
PCT Pub. Date: Aug. 26, 2021

(65) Prior Publication Data
US 2023/0061450 A1 Mar. 2, 2023

(30) Foreign Application Priority Data
Feb. 20, 2020 (KR) .................. 10-2020-0020781

(51) Int. Cl.
*C01B 32/21* (2017.01)
*B82Y 30/00* (2011.01)
*B82Y 40/00* (2011.01)

(52) U.S. Cl.
CPC .............. *C01B 32/21* (2017.08); *B82Y 30/00* (2013.01); *B82Y 40/00* (2013.01); *C01B 2204/22* (2013.01)

(58) Field of Classification Search
CPC ... C01B 32/21; C01B 2204/22; C01B 32/194; C01B 2204/24; C01B 32/182;
(Continued)

(56) References Cited

U.S. PATENT DOCUMENTS 8,575,335 B2 11/2013 Jeon et al.
9,656,871 B2 5/2017 Jeon et al.
(Continued)

FOREIGN PATENT DOCUMENTS

KR 10-2005-0050631 A 5/2005
KR 10-2012-0064980 A 6/2012
(Continued)

OTHER PUBLICATIONS

Jeon, et al., Direct nitrogen fixation at the edges of graphene nanoplates as efficient electrocatalysts for energy conversion, Scientific Reports 2013; 3: 2260, pp. 1-7 with Supplementary Information, pp. S1-S33 (Year: 2013).*
(Continued)

*Primary Examiner* — Daniel C. Mccracken
(74) *Attorney, Agent, or Firm* — WOMBLE BOND DICKINSON (US) LLP

(57) ABSTRACT

The disclosure relates to a nitrogen-doped graphitic nanoplate, and in particular to a nitrogen-doped graphitic nanoplate including, based on 100 parts by weigh of the nitrogen-doped graphitic nanoplate, 72 to 80 parts by weight of carbon; 12 to 15 parts by weight of nitrogen; and 0 to 3 parts by weight of by-product. The nitrogen-doped graphitic nanoplate barely includes by-product to enable to restrain
(Continued)

changes in material property and may be applied to catalyst supports, energy, fuel cells, etc.

3 Claims, 3 Drawing Sheets

(58) Field of Classification Search
CPC ... C01B 32/184; C01B 32/186; C01B 32/188; C01B 32/19; C01B 32/192; C01B 32/196; C01B 32/198; C01B 2204/00; C01B 2204/02; C01B 2204/04; C01B 2204/06; C01B 2204/065; C01B 2204/20; C01B 2204/26; C01B 2204/28; C01B 2204/30; C01B 2204/32; C01B 32/20; C01B 32/205; C01B 32/215; C01B 32/22; C01B 32/225; C01B 32/23; B82Y 30/00; B82Y 40/00

See application file for complete search history.

(56) References Cited

U.S. PATENT DOCUMENTS

| | | |
|---|---|---|
| 2012/0149897 A1 | 6/2012 | Jeon et al. |
| 2013/0018204 A1 | 1/2013 | Jeon et al. |
| 2019/0247858 A1* | 8/2019 | Chen ............... C01G 39/06 |

FOREIGN PATENT DOCUMENTS

| | | |
|---|---|---|
| KR | 10-2013-0009070 A | 1/2013 |
| KR | 10-2015-0098543 A | 8/2015 |
| KR | 10-2018-0099572 A | 9/2018 |
| WO | 2005/014477 A1 | 2/2005 |

OTHER PUBLICATIONS

International Search Report and Written Opinion received for PCT Patent Application No. PCT/KR2020/013220, mailed on Jan. 22, 2021, 13 pages (6 pages of English Translation and 7 pages of Original Document).

Jeon et al., "Direct nitrogen fixation at the edges of graphene nanoplatelets as efficient electrocatalysts for energy conversion", Scientific Reports, vol. 3, No. 2260, 2013, pp. 1-7.

Office Action received for Korean Patent Application No. 10-2020-0020781, mailed on Apr. 21, 2021, 7 pages (4 pages of English Translation and 3 pages of Office Action).

Office Action received for Korean Patent Application No. 10-2020-0020781, mailed on Sep. 14, 2021, 6 pages (3 pages of English Translation and 3 pages of Office Action).

* cited by examiner (a)

(b)

NITROGEN-DOPED GRAPHITIC NANOPLATE WITHOUT IRON DOPING AND MANUFACTURING METHOD THEREFOR

TECHNICAL FIELD

The following disclosure relates to a nitrogen-doped graphitic nanoplate without iron doping and a manufacturing method therefor. In particular, it relates to a manufacturing method of graphite whose edge is functionalized with nitrogen only, removing impurities that may be generated from the use of metal vessels and metal balls, such as iron.

BACKGROUND ART

Graphene is a base unit for graphite and is a thin one-atom-thick layer of carbon. In detail, it is a two-dimensional plane material where carbons form covalent bonds in hexagonal shapes. Graphene is a material that has thermal conductivity and electrical conductivity and has excellent physical and chemical properties. For such graphene, there are manufacturing methods, such as mechanical exfoliation, chemical exfoliation, exfoliation-reinsert-expansion, chemical vapor deposition, epitaxial growth, chemical synthesis, etc.

The mechanical exfoliation keeps the excellent properties of graphene as it is, while the final yield may be extremely low; for that reason, it may be merely used for research on the properties of graphene in laboratories and so on.

The chemical vapor deposition has an advantage that produced graphene has excellent properties; on the other hand, it needs heavy-metal catalysts, it may be able to be synthesized at high temperature (i.e., about 1,000° C.) and its product is limited depending on area of a substrate used.

The epitaxial growth may have an issue in which electricity property of produced graphene may be not good and substrate is very expensive.

Methods of mechanochemically manufacturing edge-selectively functionalized graphite using ball milling are attracting attentions as a manufacturing method of graphene in large quantity at a low cost.

Unfortunately, manufacturing edge-functionalized graphite through the mechanochemical method may have an issue in which not only the nitrogen that intends to be introduced is introduced but also metal, such as iron, that comes out when metal vessel and the metal ball collide with each other is introduced.

DISCLOSURE

Technical Problem

The following disclosure relates to a graphitic nanoplate that is doped with nitrogen without iron doping and a method for manufacturing the same for solving the conventional problems, and relates to a graphitic nanoplate in which impurities, such as iron, which may be generated from the use of a metal vessel and a metal ball, are removed through acid treatment, such that the by-product is less than 3 parts by weight, and only nitrogen is doped at the edge, and a method for manufacturing the same.

Solution to Problem

A nitrogen-doped graphitic nanoplate of the disclosure for solving the above technical problem includes: based on 100 parts by weight of the nitrogen-doped graphitic nanoplate, about 72 to about 80 parts by weight of carbon; about 12 to about 15 parts by weight of nitrogen; and 0 to about 3 parts by weight of by-product.

The by-product may be about 1 to about 2.5 parts by weight based on 100 parts by weight of the nitrogen-doped graphitic nanoplate, but is not limited thereto.

The by-product may include iron, but is not limited thereto.

A weight ratio of the nitrogen to the carbon is 1:5 to 1:8, but is not limited thereto.

A method for manufacturing nitrogen-doped graphitic nanoplate includes: pulverizing graphite mechanically under nitrogen atmosphere; and conducting acid treatment on the graphite.

The pulverizing graphite may include pulverizing about 0.10 to about 0.16 g of the graphite per 1 ml of the reaction vessel, but is not limited thereto.

The nitrogen may be injected at pressure of about 2 to about 10 MPa, but is not limited thereto.

The weight ratio of the graphite to the nitrogen may be 1:3 to 1:5, but is not limited thereto.

The above-described solution to problem is merely exemplary, and should not be construed as limiting the disclosure. In addition to the examples or embodiments described above, additional examples and embodiments may exist in the drawings and detailed description.

Effects of Invention

The disclosed technology may have the following effects. However, this does not mean that a specific embodiment should include all of the following effects or only the following effects, so the scope of the disclosed technology should not be construed as being limited thereby.

According to the above-described means for solving the problems of the disclosure, a nitrogen-doped graphitic nanoplate in one or more examples of the disclosure includes very little by-products, 0 to about 3 parts by weight. Conventionally, when an edge of graphite is functionalized by a mechanochemical method, there is a problem that a large amount of by-products such as iron are introduced besides materials to be functionalized due to metals generated from the collision between a metal vessel and a metal ball used in manufacturing process. To solve this problem, in the conventional art, a process of removing metals using an acid aqueous solution was further performed after the process of pulverizing graphite. In spite of the further process, the by-product was included in an amount of about 10 parts by weight or more. The nitrogen-doped graphitic nanoplate in accordance with one or more examples was produced adjusting the mass of graphite per 1 ml of reaction vessel, thereby effectively reducing the content of impurities. Specifically, the impurity content of the nitrogen-doped graphitic nanoplate prepared under the condition that the mass of the graphite per 1 ml of the reaction vessel is about 0.10 to about 0.16 g includes in an amount of 0 to about 3 parts by weight.

The nitrogen-doped graphitic nanoplate in accordance with one or more examples of the disclosure may be applied to various uses such as catalyst support, chemical catalyst, energy conversion and storage, and fuel cell. In addition, since it is inexpensive and may be manufactured in large quantities, it is easy to reduce the cost of the process.

Furthermore, by blocking the introduction of impurities such as iron, the change in material properties of the nitrogen-doped graphitic nanoplate may be restrained due to the introduction of the impurities.

BEST MODE FOR IMPLEMENTATION OF THE INVENTION

Figure 1:
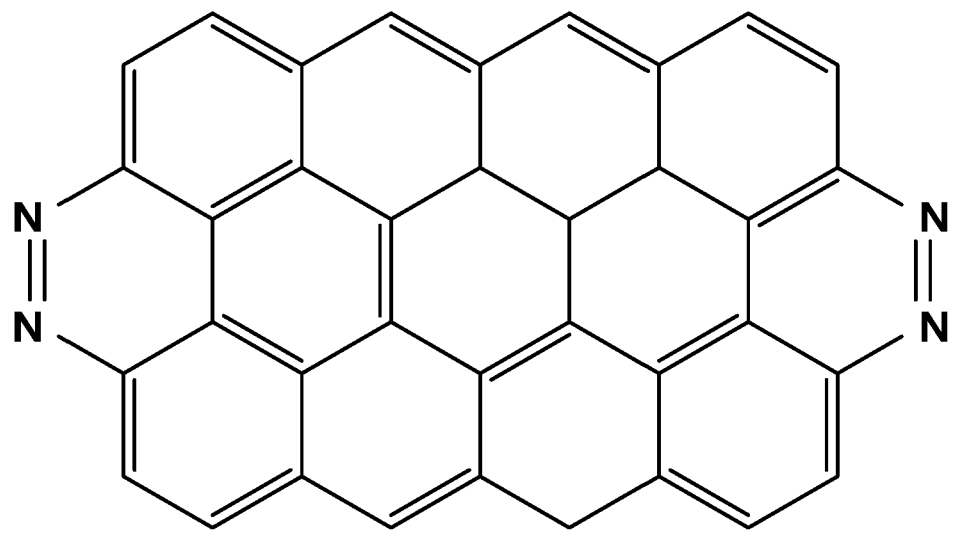
FIGS. 1(a) and 1(b) illustrate nitrogen-doped graphitic nanoplate in accordance with one or more examples of the disclosure.
Figure 1:
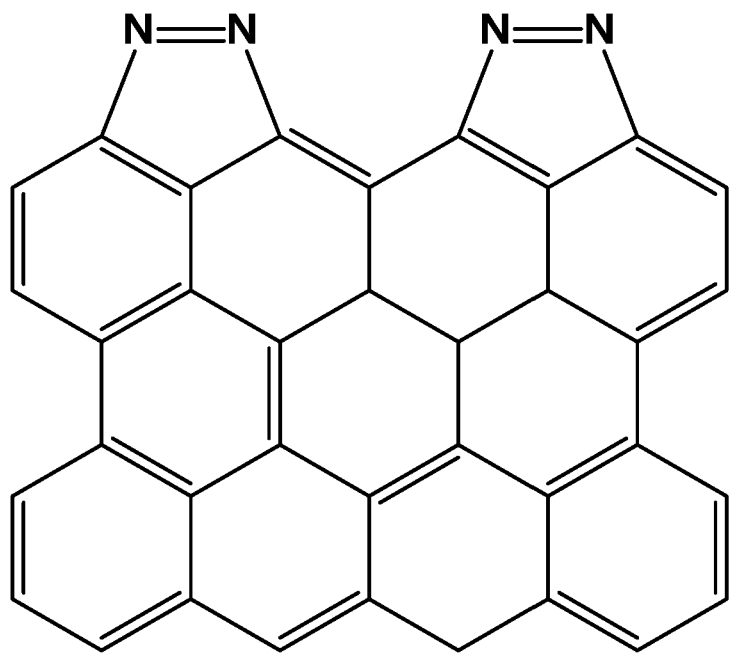

The disclosure can have various changes and can have various embodiments, so specific embodiments are illustrated in the drawings and will be described in detail in the detailed description. However, this is not intended to limit the following disclosure to a specific embodiment, it should be understood to include all modifications, equivalents and substitutes included in the spirit and scope of the disclosure.

In describing each figure, like reference numerals are used for like elements. The terms first, second, etc. may be used to describe various elements, but the elements should not be limited by the terms. The above terms are used only for the purpose of distinguishing one component from another.

For example, without departing from the scope of the present invention, a first component may be referred to as a second component, and similarly, a second component may also be referred to as a first component. The term "and/or" includes a combination of a plurality of related listed items or any of a plurality of related listed items.

Unless defined otherwise, all terms used herein, including technical or scientific terms, have the same meaning as commonly understood by one of ordinary skill in the art to which this invention belongs.

Terms such as those defined in a commonly used dictionary should be interpreted as having a meaning consistent with the meaning in the context of the related art. Unless explicitly defined in this disclosure, it should not be construed in an idealistic or overly formal sense.

Throughout this specification, when it is said that a member is positioned "on", "above", or "under" another member, this includes not only a case in which one member is in contact with another member, but also a case in which another member exists between two members.

Throughout this specification, when a part "includes" a certain component, it means that other components may be further included, rather than excluding other components, unless otherwise stated.

As used herein, the terms "about," "substantially," etc., to the extent used herein, are used in or close to the numerical value when the manufacturing and material tolerances inherent in the stated meaning are presented, and to aid in the understanding of the present application. It is used to prevent an unconscionable infringer from using the mentioned disclosure unfairly. Also, throughout this specification, "step to" or "step of" does not mean "step for".

Throughout this specification, the term "combination of these" included in the expression of the Markush form means one or more mixtures or combinations selected from the group consisting of the components described in the expression of the Markush form, and it means to include one or more selected from the group consisting of the above components.

Hereinafter, a nitrogen-doped graphitic nanoplate without iron doping and a method for manufacturing the same will be described in detail in accordance with one or more examples of the disclosure with reference to embodiments, examples, and drawings. However, the following disclosure is not limited to these embodiments and examples and drawings.

The following disclosure relates to a nitrogen-doped graphitic nanoplate including, based on 100 parts by weigh of the nitrogen-doped graphitic nanoplate, about 72 to about 80 parts by weight of carbon, about 12 to about 15 parts by weight of nitrogen, and 0 to about 3 parts by weight of by-product.

The nitrogen-doped graphitic nanoplate indicates that edge of the graphitic nanoplate is doped with nitrogen.

The by-product may be included in an amount of about 1 to about 2.5 parts by weight based on 100 parts by weight of the nitrogen-doped graphitic nanoplate, but is not limited thereto.

The by-product may be iron, but is not limited thereto.

The nitrogen-doped graphitic nanoplate include in an amount of 0 to about 3 parts by weight, which is very little, in accordance with one or more examples. When the edge of graphite is functionalized by a conventional mechanochemical method, there is a problem that a large amount of by-products such as iron are introduced besides materials to be functionalized due to metals arising from the collision between a metal vessel and a metal ball used in manufacturing process. In order to solve this problem, in the prior art, a process of removing metals using an acid aqueous solution was further performed after the process of pulverizing graphite. In spite of the further process, the by-product was included in an amount of 10 parts by weight or more. The nitrogen-doped graphitic nanoplate in accordance with one or more examples was produced adjusting the mass of graphite per 1 ml of reaction vessel, thereby effectively reducing the content of impurities. Specifically, the impurity content of the nitrogen-doped graphitic nanoplate prepared under the condition that the mass of the graphite per 1 ml of the reaction vessel is about 0.10 to about 0.16 g includes in an amount of 0 to about 3 parts by weight.

FIGS. 1(a) and 1(b) illustrate nitrogen-doped graphitic nanoplate in accordance with one or more examples of the disclosure.

FIG. 1(a) illustrates that a pyridazine ring is formed by nitrogen doping at the edge of the graphite nanoplate when the edge is an armchair-edge, and FIG. 1(b) illustrates that a pyrazole ring is formed by nitrogen doping at the edge of the graphite nanoplate when the edge is a zigzag-edge.

The weight ratio of the nitrogen to carbon may be 1:5 to 1:8, but is not limited thereto.

The molar ratio of the nitrogen to the carbon may be 1:5 to 1:8, but is not limited thereto. Preferably, it may be 1:6 to 1:8.

Specifically, the molar ratio (C/N) of the nitrogen (N) to the carbon (C) may be represented as about 5 to about 8. Preferably, it may be represented as about 6 to about 8.

The nitrogen-doped graphitic nanoplate may have an average diameter of 50 nm or more, but is not limited thereto.

The nitrogen-doped graphitic nanoplate in accordance with one or more examples of the disclosure may be applied to various uses such as catalyst support, chemical catalyst, energy conversion and storage, and fuel cell. In addition, since it is inexpensive and may be manufactured in large quantities, it is easy to reduce the cost of the process.

In addition, it is capable of restraining changes in material properties of the nitrogen-doped graphitic nanoplate by blocking introduction of impurities such as iron.

A method for manufacturing nitrogen-doped graphitic nanoplate in accordance with one or more examples of the disclosure includes pulverizing graphite mechanically under nitrogen atmosphere and conducting acid treatment on the pulverized graphite.

Figure 2:
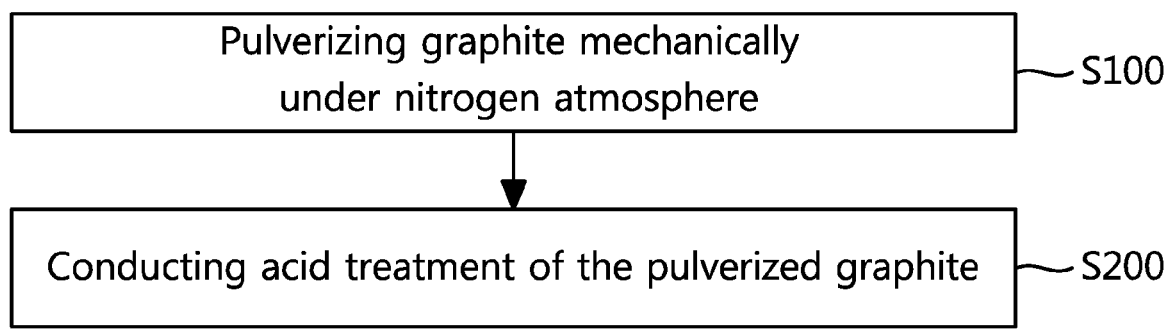
FIG. 2 illustrates a flow chart for a manufacturing method of nitrogen-doped graphitic nanoplate in accordance with one or more examples of the disclosure.

FIG. 2 illustrates a flow chart for a manufacturing method of nitrogen-doped graphitic nanoplate in accordance with one or more examples of the disclosure.

First, graphite is mechanically pulverized under nitrogen atmosphere (S100).

The weight ratio of the graphite to the nitrogen may be 1:3 to 1:5, but is not limited thereto.

The molar ratio of the graphite to the nitrogen may be 1:3 to 1:5, but is not limited thereto.

If the molar ratio of the graphite to the nitrogen may be less than 1:3, the nitrogen does not sufficiently react with edge of the graphite, such that a sufficiently nitrogen-doped graphitic nanoplate cannot be obtained.

The pulverizing step may be a step of pulverizing about 0.10 to about 0.16 g of the graphite per 1 ml of the reaction vessel, but is not limited thereto.

Regarding the reaction vessel for pulverizing graphite, any material is available, and a reaction vessel made of a metal material may be used.

If the mass of the graphite per 1 ml of the reaction vessel is less than 0.10 g, an amount of impurities in the manufactured nitrogen-doped graphitic nanoplate may increase.

The nitrogen may be infused into the reaction vessel at a pressure of about 2 to about 10 MPa to form the nitrogen atmosphere, but is not limited thereto.

The pulverizing may indicate pulverizing for about 24 to about 60 hours at a speed of 300 to 600 rpm, but is not limited thereto.

Then, acid treatment is conducted for the pulverized graphite (S200).

The acid treatment may be conducted using an aqueous solution of an acid having a pH of 3 or less.

The acid may include an acid selected from a group of hydrochloric acid, sulfuric acid, nitric acid, carbonic acid, phosphoric acid, acetic acid, perchloric acid, and combinations thereof, but is not limited thereto.

The aqueous solution of the acid may be used at a concentration of about 0.1 to about 5.0 M, but is not limited thereto.

The acid treatment may be conducted for about 12 to about 96 hours, but is not limited thereto.

As the graphite is pulverized through the pulverizing process, carbon at the edge of the graphite gets to have electric charges or is in the form of a radical. The carbon that has electric charge or in the form of a radical reacts with the nitrogen to form a nitrogen-doped graphitic nanoplate. During the pulverizing process, carbon at the edge of the graphite gets to have electric charge or is in the form of a radical, and the carbon and the nitrogen react each other such that only the edge of the graphite is doped with the nitrogen.

In addition, conventionally, iron that comes out when a metal vessel and a metal ball collide with each other and carbon that is in the form of a radical react each other such that a graphitic nanoplate doped with not only nitrogen but also iron is formed. On the other hand, in accordance with one or more examples of the disclosure, a nitrogen-doped graphitic nanoplate where a content of impurities, such as iron, is reduced may be manufactured by adjusting a ratio of a mass of graphite to a volume of a reaction vessel.

The disclosure will be described in more detail through the following examples, but the following examples are for illustrative purposes only and are not intended to limit the scope of the present disclosure.

Embodiment 1

First, 30 g of graphite (99%, 32 mesh) was put into a metal pulverizing vessel of 250 ml. The air in the metal pulverizing vessel was removed using a vacuum pump, and 3 MPa of nitrogen gas was injected and then pulverized at a speed of about 500 rpm for 48 hours. After the pulverization was all completed, a pulverized material was treated with 1 M hydrochloric acid for 60 hours to completely remove metals that do not react with the graphite. After that, a nitrogen-doped graphitic nanoplate (0.12 g/ml, mass of graphite to reaction vessel) was manufactured by freeze-drying.

Embodiment 2

A nitrogen-doped graphitic nanoplate (0.16 g/ml) was manufactured in the same manner as Embodiment 1, except that 40 g of graphite was put and 4 MPa of nitrogen gas was injected.

Comparative Example 1

A nitrogen-doped graphitic nanoplate (0.02 g/ml) was manufactured in the same manner as Embodiment 1, except that 5 g of graphite was put and 1 MPa of nitrogen gas was injected.

Comparative Example 2

A nitrogen-doped graphitic nanoplate (0.04 g/ml) was manufactured in the same manner as Embodiment 1, except that 10 g of graphite was put and 1 MPa of nitrogen gas was injected.

Comparative Example 3

A nitrogen-doped graphitic nanoplate (0.08 g/ml) was manufactured in the same manner as Embodiment 1, except that 20 g of graphite was put and 2 MPa of nitrogen gas was injected.

Comparative Example 4

As Comparative Example 4, graphite (99%, 32 mesh) was used.

Evaluation

1. Analysis of Characteristics of Nitrogen-Doped Graphitic Nanoplate

Elemental analysis was performed on the nitrogen-doped graphitic nanoplate manufactured in the above embodiments and comparative examples, and the results are shown in Table 1 below.

TABLE 1

| Sample | Amount of graphite | Content of carbon (wt %) | Content of hydrogen (wt %) | Content of nitrogen (wt %) | Char (wt %) |
|---|---|---|---|---|---|
| Embodiment 1 | 30 g | 74.2 | 0.8 | 14.1 | 1.4 |
| Embodiment 2 | 40 g | 73.3 | 1.2 | 12.9 | 2.2 |
| Comparative Example 1 | 5 g | 70.7 | 0.8 | 14.8 | 20.4 |
| Comparative Example 2 | 10 g | 64.2 | 0.7 | 13.1 | 5.2 |
| Comparative Example 3 | 20 g | 71.2 | 1.1 | 13.6 | 3.6 |
| Comparative Example 4 | Control group | 99.6 | 0 | 0 | 2.4 |

According to the results shown in Table 1, it is confirmed that a content of Char, which is an impurity, was the least detected in Embodiment 1; and that contents of Char of Embodiments 1 and 2 were detected less than 2.4 wt %, which is the content of Char of graphite. While, Char content of the nitrogen-doped graphitic nanoplate manufactured in Comparative Example was detected up to 20.4 wt %, from which it is confirmed that a large amount of impurities were detected.

The Char includes metal that comes out when a metal vessel and a metal ball collide with each other in the pulverizing step (ball mill process), which is a process of manufacturing the nitrogen-doped graphitic nanoplate. Specifically, carbon at the edge of the graphite become charged or in the form of a radical through the pulverizing process. At this time, the carbon having electric charges or in the form of a radical reacts with the metal that comes out when the metal vessel and the metal ball collide with each other to form a graphitic nanoplate doped with metal (i.e., iron) as well as nitrogen. However, when the graphite is added and pulverized at a certain ratio or more compared to the reaction vessel (metal vessel), the graphite protects the metal vessel and the metal ball while restraining the phenomenon of metal pulverization. As a result, by adjusting the ratio of the mass of graphite to a volume of the reaction vessel, a nitrogen-introduced graphitic nanoplate into which by-products, such as iron, are not introduced may be obtained.

Figure 3:
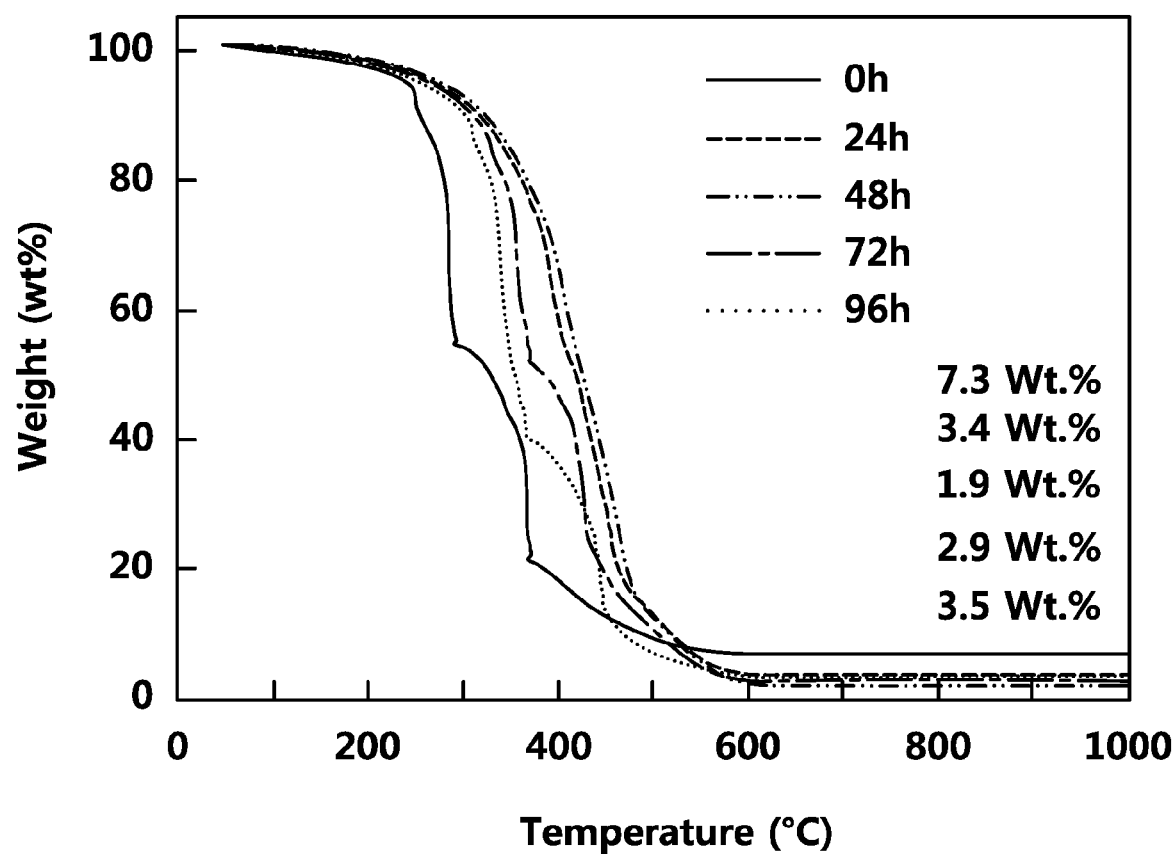
FIG. 3 is a thermogravimetric analysis curve for nitrogen-doped graphitic nanoplate in accordance with one or more examples of the disclosure.

When the nitrogen-doped graphitic nanoplate of Embodiment 2 was prepared, thermogravimetric analysis was performed according to the acid treatment time, and the results are shown in FIG. 3.

FIG. 3 is a thermogravimetric analysis curve for nitrogen-doped graphitic nanoplate in accordance with one or more examples of the disclosure.

According to the results shown in FIG. 3, it is confirmed that the content of Char, which is an impurity, was 7.3 wt % when no acid treatment was conducted, 3.4 wt % when acid treatment was conducted for 24 hours, 1.9 wt % when conducted for 48 hours, and 2.9 wt % when conducted for 72 hours, and 3.5 wt % when conducted for 96 hours. It is confirmed that the content of impurities decreases as the time for acid treatment increases, and that the least impurities are generated when the treatment was conducted for 48 hours, while the content of impurities increases again when the time for treatment increases from 48 hours.

The above description of the disclosure is for illustration, and a person skilled in the art to which the disclosure pertains will understand that it can be easily modified into other specific forms without changing the technical spirit or essential features of the disclosure. Therefore, it should be understood that the embodiments described above are illustrative in all respects and not restrictive. For example, each component described as a single type may be implemented in a dispersed form, and likewise components described as distributed may be implemented in a combined form.

The scope of the disclosure is indicated by the following claims rather than the above detailed description, and all changes or modifications derived from the meaning and scope of the claims and their equivalents should be construed as being included in the scope of the disclosure.

What is claimed is:

1. A method for manufacturing nitrogen-doped graphitic nanoplate, comprising:
   pulverizing graphite mechanically under nitrogen atmosphere; and
   conducting acid treatment on the graphite,
   wherein the pulverizing graphite includes pulverizing 0.10 to 0.16 g of the graphite per 1 ml of a reaction vessel.

2. The method of claim 1,
   wherein the nitrogen is infused at pressure of 2 to 10 MPa.

3. The method of claim 1,
   wherein the weight ratio of the graphite to the nitrogen is 1:3 to 1:5.

* * * * *